MEMORY WITH CORES THREADED BY SINGLE CONDUCTORS

Filed June 1, 1964

INVENTOR.
Richard L. Snyder

United States Patent Office 3,432,823
Patented Mar. 11, 196

3,432,823

MEMORY WITH CORES THREADED BY SINGLE CONDUCTORS

Richard L. Snyder, 1313 N. Kroeger Ave., Fullerton, Calif. 92631

Filed June 1, 1964, Ser. No. 371,592
U.S. Cl. 340—174 8 Claims
Int. Cl. G11b 5/00

ABSTRACT OF THE DISCLOSURE

Coincident current magnetic memory employing plated wire cores utilizing domain wall switching. The memory may be a three-dimensional array employing inhibit conductors, and a printed circuit conductor network may be used in conjunction with plated wire cores.

This invention is concerned with magnetic core memories used in digital data handling systems and more particularly memories having cylindrical cores threaded by a single conductor subject to switching forces resulting from the combination of magnetic fields produced by the flow of current through the central conductor and through one or more conductors located outside the core.

Numerous magnetic memories have been described in which bits of information are stored in large numbers of individual ring shaped magnetic cores. Only selected cores in the memory are subject to storage and retrieval operations at a time. These are selected and controlled by a combination of signals on wires which thread a number of other cores which do not participate in the particular operation. The number of selecting wires and connected circuits is much smaller than the number of cores. The most widely used cores are molded from ferrite and have rectangular hysteresis loop characteristics. The cores are usually arranged in a plane orthogonal array and each is threaded by several wires. Two of the wires passing through the cores are generally parallel to the coordinates of the array. One threads a row of cores, the other a column. They are frequently called X and Y select wires. There are as many X wires as there are columns of cores and as many Y wires as there are rows of cores. In the most common type of memories, two other wires thread all of the cores in one planar array. One of these, the sense wire, is connected to the output system to which it conducts a signal when any core in the plane switches or reverses its polarity. Current may flow in the other conductor, called the inhibit line, during the information storage operation to prevent switching of a core. In operation, one X and one Y wire is energized by the passage of equal currents in first one direction and then in the opposite direction. Where these two wires pass through the same core, the currents are in the same direction so that the magnetic fields they produce add. The sum of their magnetomotive forces is slightly greater than that required to switch the field in the core from $+B_r$ to $-B_r$. Due to the rectangular hysteresis characteristic of the magnetic material, the current in each wire where it passes through other cores along the coordinate produces too little magnetomotive force to cause switching. During the first phase of the operation when positive current flows, a core at the intersection of the X and Y wires having the polarity representing one switches to zero polarity and induces a signal in the sense line. If the core is initially in the zero state, no switching occurs and no signal is generated. This phase of operation is called the read phase and during it, information is retrieved. In the second phase, called the write phase, currents in the selected X and Y wire are reversed and generate magnetomotive forces in th core at their intersection which are great enough t switch it to one. Other cores on each line are not per manently disturbed. When a one is to be stored in th selected core, switching of the core at the intersectio of the energized X and Y conductors is permitted to pro ceed under the influence of their combined fields. If zero is to be stored, the inhibit line is energized by th passage of a current equal to that flowing in one of th coordinate lines. The current direction in the inhibi line, where it passes through the selected core, is op posite that of the X and Y line currents. The resultin field cancels half the switching field and prevents th core from switching to the one polarity. All other core in the array are subject to fields not greater than hal the switching field. There are usually as many plana arrays of cores as there are bits in the standard word o the system. In the other planes, the corresponding X an Y lines are energized by the same signals. Separate in put and output circuits are provided for each plane s that all the bits of a word are retrieved or stored simul taneously.

While this system is very effective, it has a number o drawbacks. The cost of producing large numbers of in dividual cores and threading each with several wire is so great that memories are limited to much smalle capacity by economic considerations than would othe wise be the case. To accommodate passage of the variou wires, the cores must have appreciable size so that memory of reasonable capacity is quite bulky and als requires the use of sense and inhibit wires of such lengt that serious signal delay and attenuation are encountere The large size of the core also limits the switching spee The memory cycle time generally limits the overall spee of the system so that the rate at which a given operatio can be performed is slower than it would be otherwis and, hence, the cost is greater. Large cores also requir larger amounts of energy to switch them and high pow ered circuit elements must be used and large amoun of heat dissipated.

In the present invention, means of controlling the com binatorial switching of cylindrical cores threaded by single conductor are described. Such cores can be pro duced by depositing magnetic material on a small diame ter wire as described in my copending application, en titled, "Oriented Magnetic Memory Cores," Ser. No 371,591. Production of cores in this manner may be ac complished by a continuous electroplating operation a much lower cost than that of producing individual ferrit cores. The installation of cores plated on wire can b effected by a relatively simple winding operation. Wir mounted cores can be so small that their switching powe requirements are an order of magnitude less than thos of conventional cores and the speed of switching nearl an order of magnitude faster. The smaller core size an simplification of assembly results in a very compact struc ture. There are, therefore, a number of objectives to b fulfilled by this invention.

One important object of the present invention is t provide a bit storage element in the form of a magneti core having a closed magnetic path which encircles single conductor and is subject to being switched by mag netic fields from a combination of magnetomotive force generated by current in the wire threading the core an by current in one or more conductors outside the core an close to and parallel to the conductor threading the co so that the combined magnetizing forces are substantiall parallel to at least one section of the magnetic path of th core.

Another object is to provide relatively simple method f combinatorially selecting prescribed cores in a memory ı which the cores are threaded by single conductors using :andard addressing techniques for energizing conductors 'hich do not pass through the cores and using the conuctor which does pass through the cores as a sense and 'rite control line.

Another object of the invention is to provide a core ıemory in which the cores are threaded by single conuctors which serve as sense and write control lines and lso as one of a set of address selecting conductors while nother set of conductors passing outside the core proides the second address selecting conductors.

Still another object of the invention is to provide ciruits and means for coupling the core array thereto which ermit the use of single conductors passing through cores ɔ act as sense lines, write control lines and as address electing conductors.

Another object of the invention is to provide a basic witching system which can be used in memories having ores threaded by single conductors in which magnetic doıain wall motion switching can be used.

Another object of the invention is to provide a memory ı which cores can be switched in the domain wall mo-:on mode at very high speeds.

Still another object of this invention is to provide means f switching cores having a closed magnetic path and ectangular hysteresis characteristics and threaded by a ingle conductor which combines the function of one of ıe two sets of address conductors, write control conuctor and sense signal conductor, the other set of adress conductors being located outside the core.

These and other objects of the present invention will e apparent from the following specifications and the ccompanying drawings in which.

This invention provides memories in which the cores have closed magnetic paths which enclose single wires. In accordance with the invention, the cores may be composed of magnetic material deposited on the surface of wire and circumferentially oriented, or possess rectangular hysteresis loop characteristics.

Figures 1, 2, 3, 4, 5, 6, 7, 8:
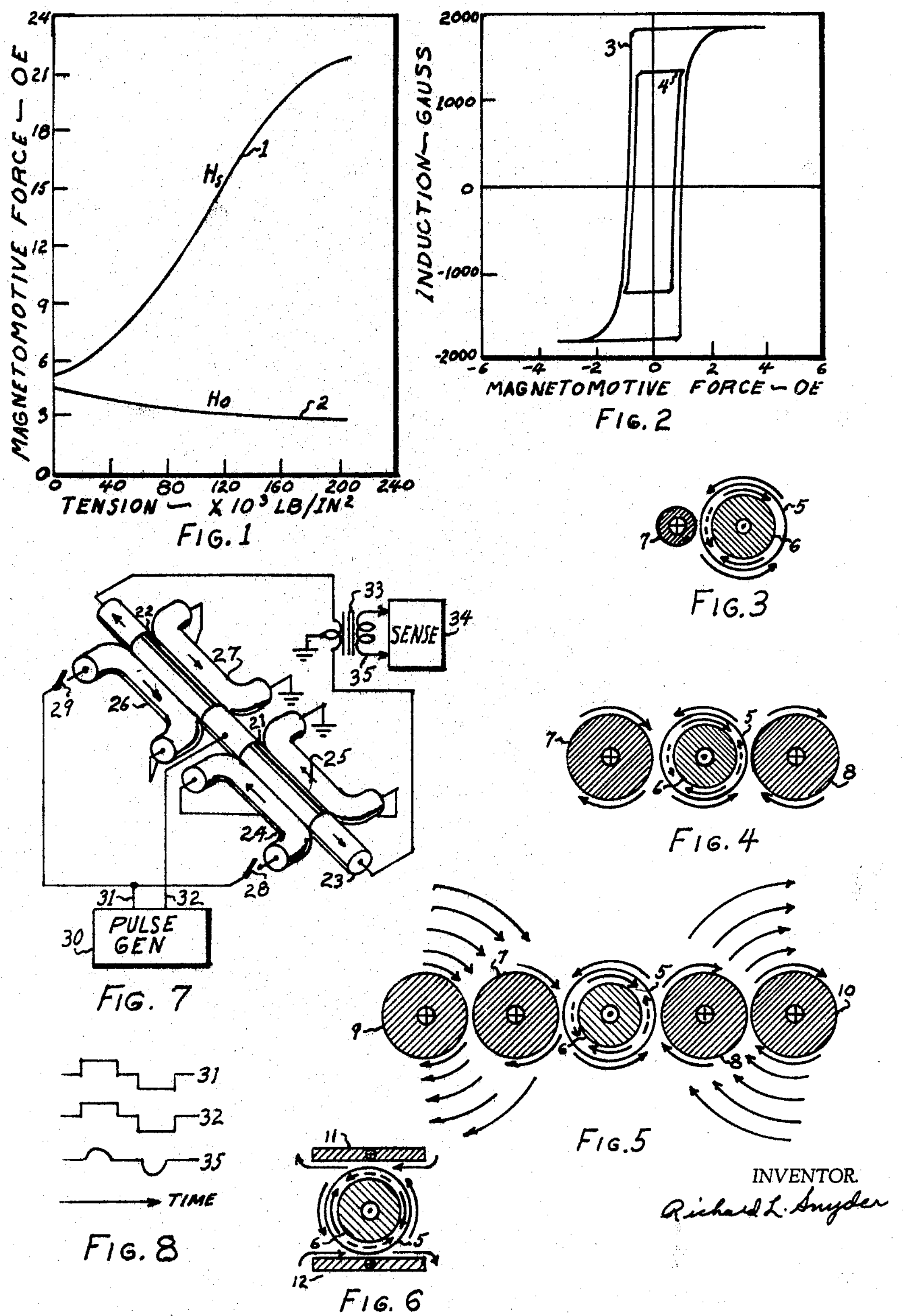
FIGURE 1 shows the switching characteristics of a fine ıagnetic wire as a function of tension having various egrees of orientation.
FIGURE 2 shows typical characteristics of magnetic ıaterial compounded and treated to produce rectangular ysteresis loops.
FIGURE 3 shows a simple arrangement in accordance 'ith the invention to control the formation of a magnetic omain in a thin walled core threaded by a single conuctor.
FIGURE 4 shows a balanced method of controlling the ɔrmation of symmetrical domains in a cylindrical core in ccordance with the invention.
FIGURE 5 shows a dual balanced control of magnetic omain formation in accordance with the invention.
FIGURE 6 shows the use of ribbon control conductors ı place of round wires.
FIGURE 7 illustrates a simple selective control for witching one of two cylindrical cores placed on a comıon conductor in accordance with the invention.
FIGURE 8 is a diagram of various signals generated in ıe system shown in FIGURE 7.

FIGURE 1 illustrates the behavior of bulk magnetic material subject to various degrees of orientation. In this case, it is composed of a nickel iron alloy having 72 percent nickel, in the form of a hard drawn wire 0.001 inch in diameter. Orientation parallel to the wire axis is induced by stressing the material in tension. The ordinate represents the magnitude of an externally applied magnetomotive force and the abscissa of the stress in the wire. The degrees of orientation is a function of the strain in the wire. The upper curve 1 records the switching field $H_s$ required to reverse the magnetism in a central section of uniformly magnetized wire. This is sometimes called the nucleating field. When this operation is performed, a magnetic domain in the same direction as the applied magnetomotive force is formed between two other domains which retain their fields in the initial direction. At the boundaries between the adjacent domains are domain walls where two like poles, one from each of the domains, are formed. When a domain wall is subject to externally aplied magnetomotive force of sufficient magnitude, the wall will move to expand the domain having the polarity of the applied force. This field can be less than the nucleating field. The lower curve 2 shows the field at which domain walls commence to move in this material for various degrees of orientation. The velocity of domain wall motion increases with applied field from zero at $H_0$ to the range of 5,000 feet per second just below $H_s$. Annealing the wire causes curves to have much the same shape but both the magnetizing forces and the stresses are considerably reduced.

Domains formed in magnetic bodies having large length to cross section ratios oriented along the long dimension can be stable, that is, they can sustain themselves without being subject to external applied magnetomotive forces, if they are long enough. The minimum stable length of a domain having specified dimensions is an inverse function of the coercivity of the material. For example, magnetic material having the properties indicated near the right hand ends of the curves in FIGURE 1 in the form of wire one-thousandth of an inch in diameter can support domains less than one-eighth inch long. Domains shorter than the minimum length required for stability can be maintained by externally applied magnetomotive force. When the external sustaining force is removed, there is insufficient material to provide the magnetomotive force required to resist the attraction between the poles at the end of the domain. The effect is, of course, compounded by the increased force between the poles which result from their proximity.

When the hysteresis loop of a specimen of oriented magnetic material, having a geometry which permits the formation of domains, is measured at a frequency which is low compared to the frequency at which a domain wall can traverse the specimen a nearly perfect rectangular hysteresis loop is observed. This occurs because the specimen completely magnetized in one polarity will not be disturbed until a magnetomotive force intense enough to nucleate a domain in the region has developed. After such a domain has formed its walls, subject to magnetomotive forces far in excess of that required to cause them to move, traverse the specimen at their maximum velocity. If the specimen has reasonable uniformity, numerous domains are formed almost simultaneously and the distance, which the walls must travel to cause them to join, is very small so that reversal of the flux is extremely rapid. This type of hysteresis characteristic has sometimes been called "over square" because as soon as one domain has been formed, the applied magnetomotive force can be reduced and flux reversal will continue to completion at the lower field strength.

There are other materials which exhibit hysteresis loops that are nearly rectangular. These materials exhibit this characteristic in bodies having almost any shape. The molecular mechanism which provides these characteristics is very complicated and not clearly understood.

FIGURE 2 shows the characteristic behavior of magnetic materials having rectangular hysteresis loops. A major loop 3 is produced by an alternating magnetomotive force having a peak value equal to the saturating field of material. A minor loop 4 is produced by an alternating magnetizing force of considerably less amplitude. Such characteristics are obtained in some ferrite bodies. They are also obtained with an even greater degree of "squareness" in cold worked nickel iron alloys having about equal parts nickel and iron.

FIGURE 3 illustrates the basic principle employed in this invention for controlling the switching of circumferentially magnetized cylindrical cores encircling a single concentrically located conductor. It shows the cross section of cylindrical core 5 and its supporting wire 6. Close beside the core and insulated therefrom is a control wire 7. A circumferentially oriented core having characteristics like those shown near the right hand end of the curves in FIGURE 1 is switched by the combined magnetomotive forces generated by currents passing through the core wire 6 and the control wire 7. When the core 5 is initially magnetized with a clockwise polarity as indicated by the solid arrows in the core 5, a current is passed through core wire 6 which generates a magnetomotive force having counterclockwise polarity as shown by the curved arrows outside the core. The magnitude of the counterclockwise field is greater than $H_o$, the field required to cause domain wall motion but less than $H_s$ the field required to establish a new domain. A current is also passed through the control wire in the direction opposite that in the core wire which generates a clockwise field about the control wire. The two fields combine in an additive manner in the region of the core nearest the control wire. The current amplitude in the control wire is large enough to cause the combined fields to exceed $H_s$ and form a new domain having counterclockwise polarity in the region of the core near the control wire. The walls of the domain so formed under the influence of the field from the core wire current move to expand the new domain and destroy the old one.

In using this principle in practical structures, mechanical considerations make it desirable to have the control wire of the same diameter as the core. Under these circumstances, the field that extends outward from the surface of the control wire to the core region farthest from the control wire opposes that from the current in the core wire and can slow or stop the domain wall movement. This interference with the switching operation can be eliminated by using two control wires in the symmetrical array shown in FIGURE 4. The core 5 on the core wire 6 is placed between two control wires 7 and 8. The switching operation is the same except two domains are nucleated, one on each side of the core. As a result, the switching speed is increased because the domain walls traverse only one quarter of the circumference instead of half. In the plane, midway between the two control wires, which passes through the center of the core, the fields from the control wires cancel each other. This field interaction also reduces the fields at their regions of use so that it is necessary to pass more current through each control wire to produce the desired nucleating field than is required when a single wire is used.

A second set of control wires may be placed on either side of the first set to provide for combinatorial generation of nucleating fields. Such an arrangement is shown in FIGURE 5. The core 5 on its wire substrate 6 is cen trally located between the control wires 7 and 8. O either side of the control wires are the secondary contr wires 9 and 10. The secondary control wires may func tion to generate an aiding field for the control wires c they may carry current in the direction opposite that i the control wires to inhibit the influence of the latter.

The control wires need not of necessity be cylindrica Ribbon shaped control conductors like those shown i FIGURE 6 may be used in the structures in which the are formed by etched circuit techniques. The core on i substrate 6 is placed between the two strip conductors 1 and 12. It should be noted that more than one core wir can be placed between the strip conductors and both b subject to their control.

The speed with which domain wall switching can b accomplished in circumferentially oriented cylindric cores is directly related to the core diameter. For exam ple, a core 0.001 inch in diameter in the configuratio shown in FIGURE 4 will switch when the domain wal more through one quarter of its circumference or 0.0007 inch. If the walls move at half of their maximum speed c 5000 feet per second, or 30,000 inches per second, th switching time will be about 26 nanoseconds. To this mu be added rise time of signals, etc., for an effective switcl ing time of about 50 nanoseconds.

Externally generated localized fields for initiating r versal of regions of a core mounted on a central wire ca also be used to switch cores having rectangular hysteres loop characteristics. Returning to FIGURE 4 and assun ing that the core 5 on conductor 6 is formed of magneti material having a rectangular hysteresis loop, the sam conditions can be used to cause switching as in the cas of an oriented core. The magnetizing force exerted b the current in the central wire is slightly less than th required to reach the "knee" of the loop in the revers direction. After a reversing force has been applied by th addition of field from the control wire currents in th regions next to the control wires, these regions revers In consequence, the reluctance of the core in the ne polarity is reduced and the magnetomotive force fro the current in the core wire increases in the remainir regions and causes switching.

In both of these types of switching as the new domai increases in extent and the old domain decreases, th stability of the old domain diminishes and forces to co tinue switching increase. This property that enables cor to reverse their magnetism when at least one part c the core is subject to a reversing magnetomotive forc having intensity less than that required to substantiall disturb the field existing in the core and another part subject to a magnetomotive force of sufficient intensity t reverse the field therein will be called regenerative flu switching for the purposes of this description.

FIGURE 7 shows a conductor configuration which ca be used to selectively switch cores on a wire substrate i the manner described. In this arrangement, cylindric cores 21 and 22 are placed on the cylindrical substra 23. On each side of each core are placed segments c two control wires 24 and 25 and 26 and 27. The segmen in each pair of control wires are connected so that curre passes through them in the same direction. This directic is always opposite that of current flowing in the substra during switching. One terminal of each pair of contr wires is grounded. The other terminals are connect through switches 28 and 29 to one output of the pul generator 30. The pulse generator has two outputs 31 ar 32 which generate signals like those shown in FIGURE at 31 and 32. This may be a standard laboratory pul generator or one built of standard components by o skilled in the electronic art. Both outputs are, for co venience, made independently adjustable in both pul amplitude and duration. They are not necessarily t same in amplitude. A central connection is made to t substrate 23 by the wire 32 which is also connected to a utput of the pulse generator 30. The ends of the substrate 3 are connected to the terminals of the primary of an utput transformer 33 which has a grounded center tap. 'he secondary 35 of the transformer 33 is connected to ıe output device 34 which may be an amplifier or an scilloscope. If one of the switches, for example 28, is losed, a pulse of current like that shown at 32 in FIG-JRE 8 is passed through 24 and 25 when the pulse genera-ɔr 30 is triggered. At the same time, another pulse like ıat shown at 31 in FIGURE 8 is passed through the ubstrate and both sides of the balanced primary of the :ansformer 33. These pulses cause the core 21 to switch nd produce an unbalance in voltages at the transformer rimary terminals to produce an output in the secondary 5 like that shown at 35 in FIGURE 8.

Figure 9:
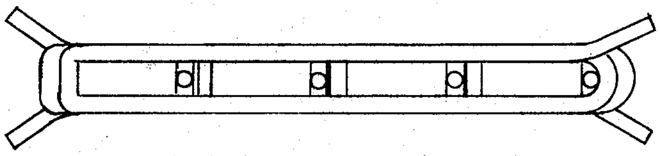
FIGURE 9 is a top view of one form of memory array ıade according to the invention.
Figures 10, 11, 12:
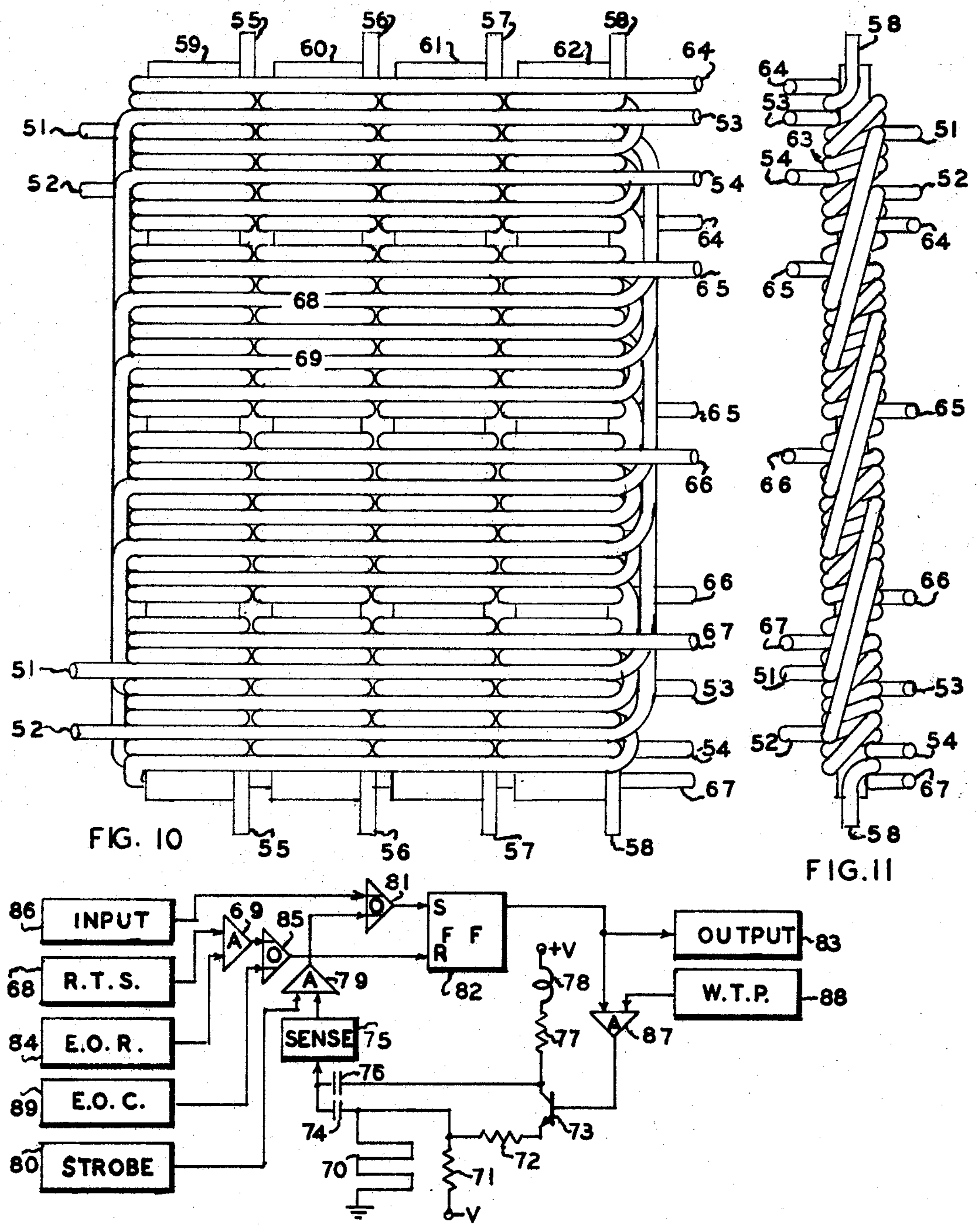
FIGURE 10 is a side view of FIGURE 9.
FIGURE 11 is an end view of FIGURE 9.
FIGURE 12 is a schematic diagram of the read-write mplifier used with the array in FIGURE 9.

FIGURES 9 and 10 and 11 show three views of a ıemory array in which both control and secondary con-:ol wires are used to select cores to be switched. This ıemory array stores sixteen four bit words. The cores re sections of a continuous deposit of circumferentially riented magnetic material on a conducting substrate wire. ndividual cores isolated from one another by regions ree of deposited magnetic material may also be used. 'our core wires 51, 52, 53 and 54 are used. Each has ixteen bit positions. There are four insulated control ⁄ires 55, 56, 57 and 58 having the same overall diameter s the core wires. The control wires are wound around our insulated rectangular supporting members 59, 60, 61 nd 62. Each turn of the control wires is placed so that here is just space to place a wire of equal diameter be-ween adjacent turns. The wires cross the wider sides of he supporting members at right angles to the edge. Across he narrower sides, the wires are laid at the angle re-uired to bring the longer sections into the proper posi-ions. This angle can be observed at 63 in FIGURE 11. 'he supports on which the control wires are wound are laced side by side and aligned so that axes of corre-ponding sections of the wires which cross the wider sur-aces of the supports are on the same lines. Four second-ry control wires 64, 65, 66 and 67 are wound around the ssembly so that the first turn of 64 and the last turn of 7 are touching the first and last turns of the control ⁄ires 55, 56, 57 and 58 and rest on the wider surfaces f the rectangular supports. The second turn of the sec-ındary control wire 64 is placed between the second and hird turns of the control wires so that there is a space ıetween the first and second control wire turns to accept he core wire 53 on the front and 51 on the back. The hird turn of 64 lies between four and fifth turns of the ontrol wires. The secondary control wire 64 is brought ɔ a terminal at the point where it completes the third urn. The first turn of the second secondary control wire 5 is placed between the sixth and seventh turns of the ontrol wires and has three turns. The remaining two sec-ındary control wires 66 and 67 also have three turns ⁄ound in the same pattern.

The core wires are also wound about the assembly. The irst core wire 53 is placed between the first and second ontrol wires in the front of the assembly where it makes ts first half turn. It completes the first turn in back lying ıetween the seventh and eighth turns of the control wires. 'he next half turn lies between the thirteenth and four-eenth turns of the control wires in front. The final turn ies between the nineteenth and twentieth turns of the ontrol wires in the rear. The second core wire 51 lies ı the complementary spaces on the opposite sides of the ssembly. The remaining two core wires 54 and 52 are laced in the spaces between the succeeding two turns of ontrol wires. Inspection of this winding pattern reveals hat each core wire passes only once between segments of particular control wire and a particular secondary con-rol wire. As mentioned above, each core wire passes be-ween sixteen such segments. Thus, if one control wire, for xample 56, is energized and one secondary wire, for ex-ımple 65, is energized only the segment of core wire 51 labeled 68 and of core wire 52 labeled 69 on the front of the array are then subject to fields from both control wires. A segment of core wire 53 and one of 54 are also subject to the combined influence of both control wires. Thus, only one core position along each core wire is sub-ject to switching by the combined influence of the control wires and secondary control wires. Elsewhere, the core wires are either free of such influence or subject to that of only one which is insufficient to cause switching. Each core wire during a switching period conducts current either in a direction which will generate circumferential fields which add to the fields from the control wires to make switching possible or conducts current in the opposite di-rection to prevent switching. These currents may be gen-erated by the circuit shown in FIGURE 12.

The circuit of FIGURE 12 not only controls the cur-rent to the core wire but also detects the output voltage which results from switching, stores the output in a data register flip-flop element and provides means for control-ling the input and output functions of the system. In the diagram, the core wire 70 is connected to two resistors 71 and 72 and at one end and to ground at the other. One resistor 71 is connected to a negative voltage and conducts current to the core wire and to the resistor 72. The cur-rent to the core wire 70 is adjusted to provide a magneto-motive force at its surface which can cause magnetic do-main wall motion in the direction of zero polarity. Current to the resistor 72, which connects to the emitter of the transistor 73, is zero or nearly zero when the transistor base is most negative. When the base is most positive, current through resistor 72 is equal to that originally flow-ing in the core wire 70 plus the current in 71 under the new conditions. Thus the current in the core wire is re-versed by the positive excursion of the transistor base to generate a magnetomotive force in the core wire capable of propagating domain walls in the direction to establish one polarity.

The terminal of the core wire 70 is also connected to a capacitor 74 which couples the sense amplifier 75. The sense amplifier is similar to sense amplifiers used in other memories, providing the linear gain required to amplify the output of a switching core to a level suitable for use in the following operations. Also connected to the input of the sense amplifier is one terminal of the capacitor 76. The other terminal of 76 is connected to the collector of the transistor 73. A resistor 77 is also connected to a source of positive voltage. The values of the resistor and inductance 77 and 78 are selected to produce an imped-ance having the same phase angle as the combined impedance of the core wire 70 and the network formed by the resistors 71 and 72. The combined impedance of the resistor 77 and inductance 78 is also selected to pro-duce as much voltage excursion of the collector as may be possible to obtain without saturating the transistor 73. The values of the capacitors 74 and 76 are in the inverse ratio of the small signal impedances of the two networks to which they are connected. This circuit, when properly balanced, forms a bridge in which the excursion of the transistor collector causes a displacement current in capacitor 76 which is equal to and balances the current in capacitor 74 caused by the voltage developed across line 70 by its current reversal when none of the cores on 70 switch. When a core switches, the resulting voltage across 70 delivers a signal through capacitor 74 to the amplifier 75 which is not balanced in the transistor col-lector circuit. It the signal occurs during a retrieve cycle, it will appear at one input of the "and" gate 79 at the same time as a strobe pulse is delivered by the strobe source 80 to produce an output from gate 79 to one of the inputs to the "or" gate 81. The output of 81 sets the flip-flop 82 to one. If the selected core on core wires 70 is initially of zero polarity, no switching occurs and no output develops. Therefore, during the strobe pulse, no signal reaches the set terminal of the flip-flop, reset at an earlier time, so the flip-flop remains at zero. The flip-flop is an element of the data register. The output of the flip-flop is then available to the connected system 83. If new information is to be stored, then a ready to store signal from the connected equipment 68 combines with the end of read pulse from source 84 in "and" gate 69 and passes through the "or" gate 85 and resets the flip-flop. An input bit from source 86 is immediately presented. If it is a one, the signal passes through the "or" gate 81 and sets the flip-flop 82 to one. If no signal is received to set the flip-flop to one before the record phase which follows retrieval, no further signals are generated in this circuit during the remainder of the read-write cycle. If the flip-flop is in the one position, either because a one had been retrieved and no store signal presented, or because a store signal had placed a one in the flip-flop, the "and" gate 87 is opened so that a write timing pulse from source 88 can pass to drive the base of the transistor 73 into conduction and reverse the current in the core wire 70. Coincidence of fields from currents generated in the control and secondary control wires by the address signals cause switching in the core wire. At the end of the operation, an end of cycle pulse from source 89 passes through the "or" gate 85 to reset the flip-flop 82 to zero. It is to be noted that during the retrieve phase of the read-write cycle, the input-output circuit is quiescent so that if a core switches, there is no disturbance created from the write signals in the transistor 73 which might otherwise be present due to imperfect balance in the bridge network.

Figure 13:
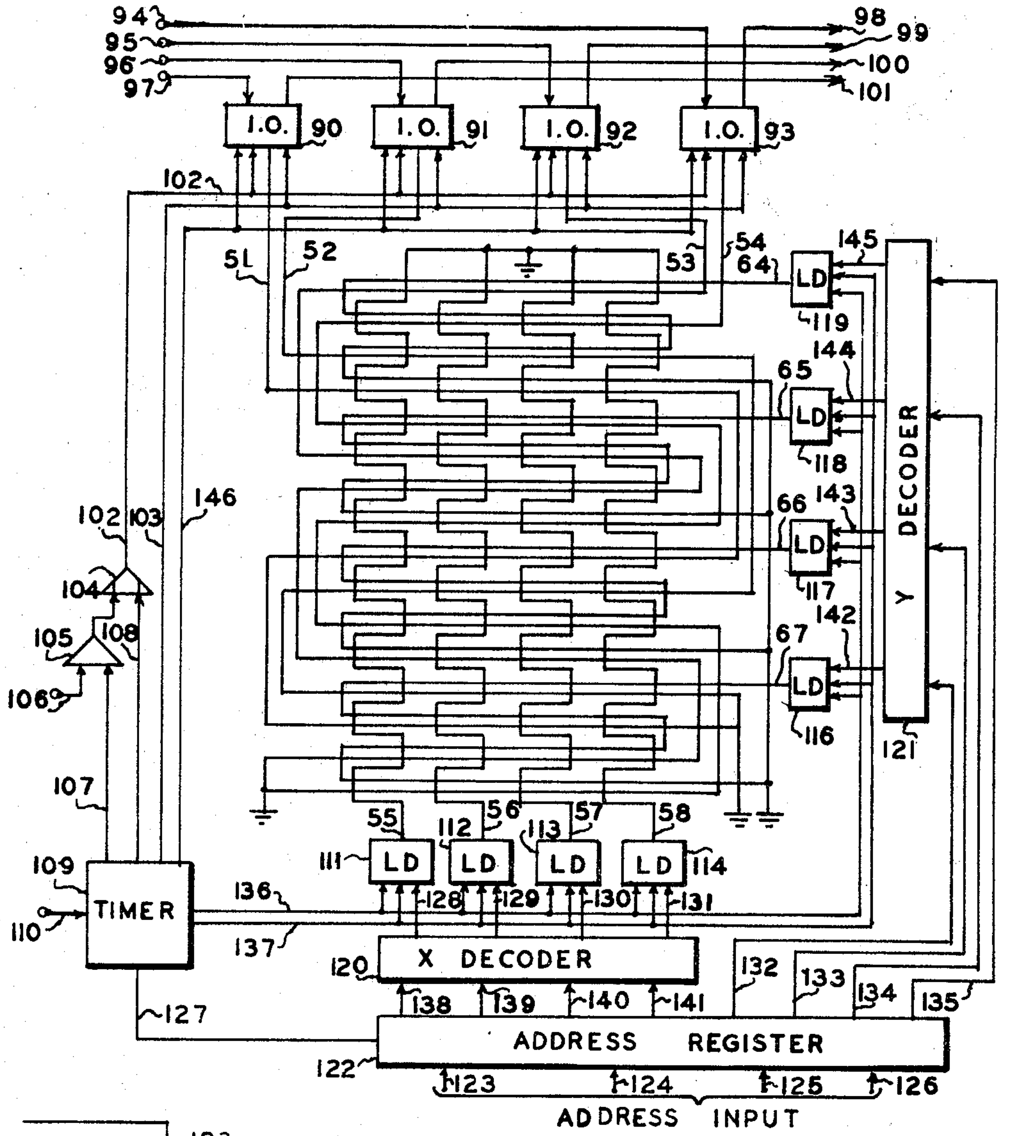
FIGURE 13 is a schematic diagram of a memory sysem having an array like that in FIGURE 9.

FIGURE 13 is a diagram of the entire memory system. At the top are four input-output circuits 90, 91, 92, and 93 which are like that shown in FIGURE 12. They are connected to four core wires 51, 52, 53, and 54 and receive information from the connected equipment through the input lines 94, 95, 96 and 97. Information retrieved from the memory is transmitted over the lines 98, 99, 100 and 101. The data register elements are reset by a pulse line 102 from the "or" gate 104. One input to 104 is delivered on line 108 from the timer at the end of the read-write cycle. The other is received from the "and" gate 105 if the ready to store line 106 is energized by the connected equipment. This pulse is received from the timer 109 on the line 107 at the end of the read phase to clear the register if the input lines are to be activated. The timer 109 which is a conventional pulse sequencing circuit commonly used in memories and other logical equipment also generates other pulses. The strobe pulse is transmitted on line 103 to the input-output circuits. The end of cycle pulse is also transmitted to clear the address registers on line 127. Pulses controlling the timing and direction of the currents in the control and secondary control lines are also generated by the timer and delivered on lines 136 and 137 to the line drivers 55, 56, 57, and 58 and 116, 117, 118, and 119. The line drivers are similar to those used in conventional coincident current core memories and may be constructed as shown in FIGURE 14.

Figure 14:
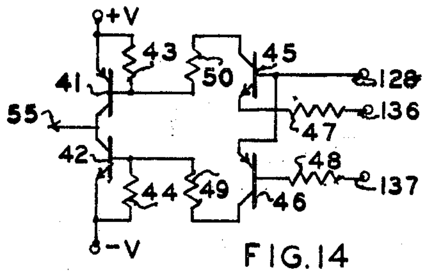
FIGURE 14 shows the circuit of a line driver shown in 'IGURE 13.

In FIGURE 14, the line to be driven 55 is connected to the collectors of a PNP transistor 41 and an NPN transistor 42. The emitter of 41 and its base return resistor 43 are connected to a source of positive voltage. The emitter of 42 and its base return resistor 44 are connected to a source of negative potential. The base of 41 is connected to the collector of the NPN transistor 45 through the current limiting resistor 50. The base of 42 is connected to the collector of the PNP transistor 46 through the current limiting resistor 49. The emitter of 46 and base of 45 are connected to the terminal 128 which is one of the outputs of a decoder. When the line driver is selected, terminal 128 is raised from a negative potential of 4 volts to ground. During the first phase of a memory cycle, the terminal 136 is driven negative 3 volts. The value of the resistor 47 is selected to cause the current to the emitter of 45 to be sufficient to draw a current through the base of 41 to cause 41 to saturate and raise 55 to within about a volt of positive supply potential. During the second phase, terminal 137 is driven negative 3 volts. The resistor 48 limits the current to the base of 46 to that required to saturate 46. Under these conditions, sufficient current flows through resistor 49 to saturate 42 and cause the line 55 to be driven to within about a volt of the negative supply potential. The line drivers in FIGURE 13 are selected for energizing by one of the outputs of the decoders to which they are connected. The decoders 120 and 121 are similar to those used in conventional memories and usually consist of diode matrices. Their purpose is to transform the binary information received from the address register into a number having a radix equal to the number of lines to be controlled. In this case 120 and 121, the X decoder and the Y decoder respectively, control four lines. Each in turn is energized by two flip-flop elements of the four element address register 122. Address information is introduced from connected equipment on lines 123, 124, 125 and 126. The binary outputs of the address register are transferred to the X decoder 120 on lines 138, 139, 140 and 141 and to the Y decoder 121 on lines 132, 133, 134, and 135. One of the four output lines from the X decoder 128, 129, 130 or 131 is energized and one of the lines from the Y decoder 143, 144, 145 or 146 is also energized. In each case, the energized decoder line enables the selected line drivers to generate currents in their connected control wires and secondary control wires. The currents during the retrieve phase of the read-write cycle are in the direction to aid in switching the cores in the positions affected to the zero polarity. During the store phase, the currents in the control wires reverse so that the fields created by them are in the direction to switch the core they affect to the one polarity. As mentioned above, only one core in each core wire is subject to the combined influence of both the active control wire and secondary control wire. During the read phase, any core in these positions having zero polarity will not be affected. Cores having one polarities in these positions will be switched to zero because the currents in the core wires during this period are all in the direction to propagate domains to enlarge zero domains and the control and secondary control wires combine to develop nucleating fields. When the store phase occurs, the polarity of cores on core wires not excited with one, signals remain unchanged because the core current is in the direction to maintain zero polarity. Cores subject to currents generated by the write one signals will reverse and store the ones until they are again interrogated. During the read phase, cores which switch from one to zero generate voltages in their respective core wires which are amplified, strobed and set up the data register flip-flop elements in the one condition.

Figure 15:
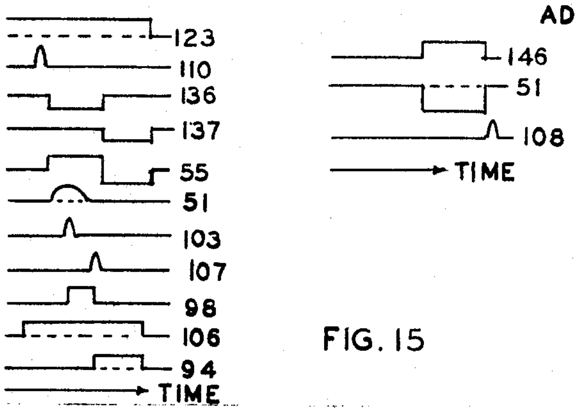
FIGURE 15 is a diagram of various signals generated ı the system in FIGURE 13.

FIGURE 15 is a diagram of various signals which occur in the system during one retrieve and store cycle. At the beginning of the cycle, address input signals have been presented on lines 123, 124, 125 and 126, any of which may be positive or ground as shown by the uppermost curve at the left of the figure. These signals cause the outputs of the address register to set up accordingly so that any of lines 138, 140, 132 and 134 may be positive. Line 139 and other odd numbered lines from the register are ground if their neighboring least even numbered line is positive. After the address register has been set up, an initiate signal may be received at any time on line 110 from connected equipment. This signal triggers the timer which produces the read phase pulse on 136 followed by the write phase pulse on 137. These signals cause each line driver selected by the decoders to generate an alternate positive and negative current pulse in one of the lines 55, 56, 57 or 58 and one of the lines 64, 65, 66 or 67. Cores in the one polarity in the positions where the two active lines combine are switched zero to develop output signals on any of the core lines 51, 52, 53, and 54. Cores in the zero polarity produce no output. The outputs are amplified by the sense amplifiers whose outputs are combined with the strobe generated by the timer on line 103 which sets the respective flip-flop elements in data register producing an output on any of the lines 98, 99, 100 and 101. If a ready to-write signal is received from the connected system on line 106 an end of read phase pulse from the timer on line 107 is passed by the "and" gate 105 through the "or" gate 104 to reset the data register flip-flops. If line 106 is not energized, the data retrieved from the memory remains in the data register until the end of the cycle. If 106 is activated, new information is received from the connected equipment on lines 94, 95, 96 and 97. At the same time, a write enable pulse is generated by the timer 110 on line 146. Core lines 51, 52, 53 and 54 connected to the input-output circuits, in which the data register flip-flops are one, have the current reversed during this period so that the cores on them subject to both active control lines are switched to one. At the end of the write phase, the timer generates an end of cycle pulse on line 127 and line 108 which, passing through the "or" gate 105, develops a signal on line 102. This end of cycle pulses clears the data register and address registers to zero to make ready for the next cycle.

The use of additive coincident currents in the control and secondary control lines requires that the margin between the filed which will not initiate domain formation and that which will in the presence of a domain wall propagation field must be less than one to two. A much greater margin can be obtained by inverting the excitation of one of the sets of lines. In this type of operation, all of the lines in a set, for example the secondary control lines 64, 65, 66 and 67, except that selected are energized with currents which generate fields that oppose the formation of domains. The selected line is not energized. In the other set of lines 55, 56, 57, and 58 the selected line is energized with sufficient current to generate fields great enough to ensure domain formation in cores which are not subject to the opposition fields from the energized secondary control lines. To write zero, current is cut off in the core lines. By this means, larger tolerances in the operating parameters of the system can be permitted.

In either type of operation, the cores on the core wires may be of the rectangular hysteresis loop type instead of the circumferentially oriented type. This type of memory will operate with any core suitable for regenerative flux switching.

The system just described provides a novel method of combinatorially switching cylindrical cores which need have only a single conductor passing through the core. It has several characteristics, however, which in common with those of the conventional core memories impose practical limits on the size in which they can be constructed. The major limitation is that sense and write signals must traverse the entire length of the core wire serving one bit position and thus produce serious signal propogation delays. A less important limitation is in the relatively large amount of power that must be supplied to energize the full length of all of the core lines and, in the second mode of operation, half the control lines. These problems are greatly reduced in the modified system shown in FIGURES 16, 17, 18, 19 and 20.

Figure 16:
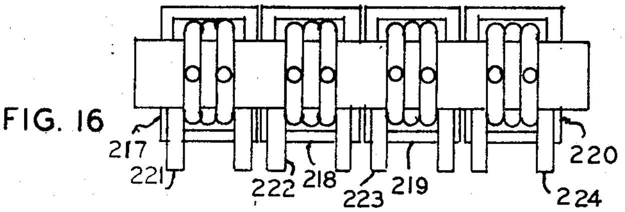
FIGURE 16 is a plan view of another memory array ıade in accordance with the invention.
Figure 18:
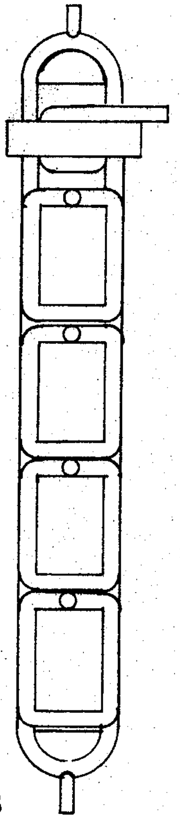
FIGURE 18 is a side elevation of FIGURE 16.
Figure 17:
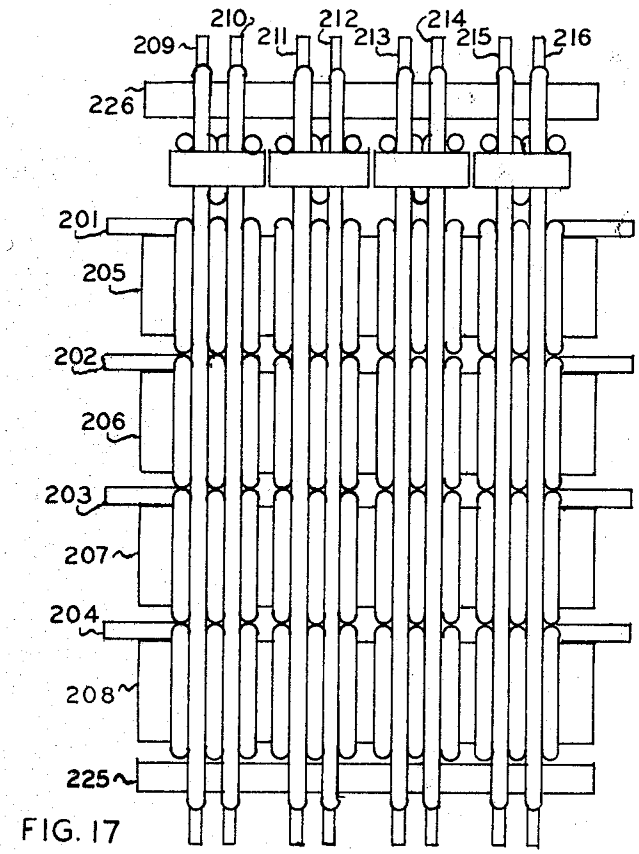
FIGURE 17 is a front elevation of FIGURE 16.

FIGURES 16, 17, and 18 show three views of the modified memory array, having a capacity of 16 four bit words. In this configuration, the secondary control wires are omitted. Their function is performed by subdividing the core wires serving each bit position into separate circuits in which the core wire currents can be independently controlled.

A convenient configuration of such a memory is shown in FIGURES 15, 16 and 17. Four insulated control wires 201, 202, 203, and 204 are wound on rectangular forms 205, 206, 207 and 208 so that where they pass over the wide sides of the form in front and back of the array, they are perpendicular to the plane of the narrow sides and spaced the diameter of a core wire apart. The forms are aligned beside on another on supports not shown so that corresponding sections of turns across the wide faces of the forms share common center lines. Four transformers 217, 218, 219 and 220 are mounted at one side of the array with a terminal block 226 beyond them. Another terminal block 225 is mounted on the other side of the array. The transformers have two window cores with a secondary winding 221, 222, 223, and 224 placed around the middle core member. The core wires 209, 210, 211, 212, 213, 214, 215, and 216 are wrapped around the array in the spaces between the control wire windings in front and back of the array. The core wires pass over the terminal block 225 where each is connected to a terminal. They also pass through the windows of the transformer cores outside the secondary windings and over the terminal block 226 where they are also connected to terminals. Each pair of wires forms a closed loop. The passage of the core wires through the transformer windows to the terminals on block 226 form the transformer primaries having center taps. The terminals on the block 225 are center taps of the core wires.

In operation with circumferentially oriented cores, current through the core wires generates the domain wall propagating magnetomotive force. The current passes between the terminals of the selected core wire loop and divides equally between the two sides of the loop. The current direction in the core wire is the same in the front and back of this array. Current in a selected control wire, on the other hand, passes in opposite directions. Therefore, depending on the relative directions of the two currents, a core position on one side of the array can be subject to switching while the core position directly opposite cannot. Reversal of one of the currents interchange the roles of the two cores.

Figure 19:
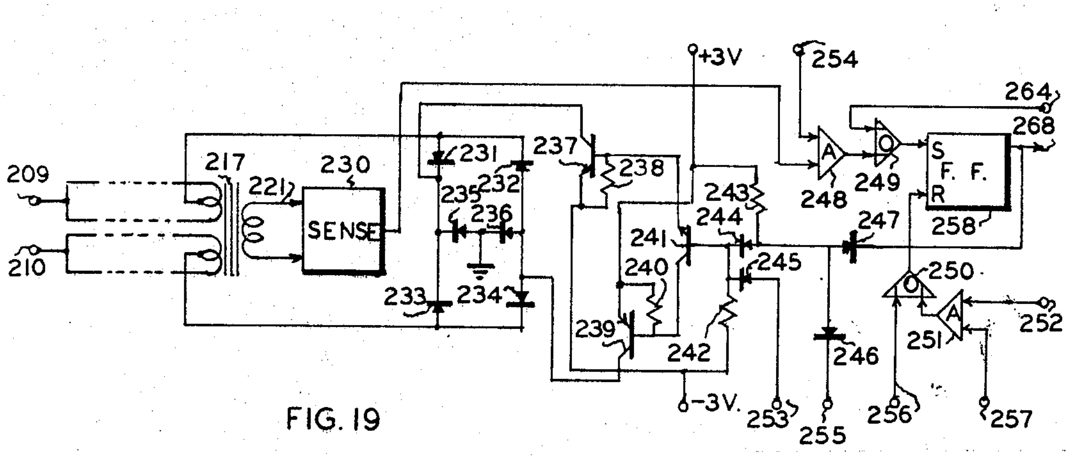
FIGURE 19 is a diagram of the read-write circuit used 'ith the array in FIGURE 16 in accordance with the ıvention.

FIGURE 19 is a diagram of the read write circuit for one bit position. There are two core wire loops 209 and 210 which constitute four address lines. They form two center tapped primaries of the transformer 217. The transformer secondary 221 is connected to a sense amplifier which is similar to sense amplifiers used in conventional memories. It is capable of amplifying signals developed in the transformer secondary to a level suitable for operation of the strobe "and" gate 248 and the following mixer "or" gate 249 and the data register flip-flop element 258. This forms the output part of the circuit. The read and write control part of the circuit is not conventional and is described in detail. The center tap of each transformer primary is connected to two clamping diodes 231 and 232 and 234 and 236. If more than two core wire loops are used per digit position, each will require two similar diodes. The diodes having their anodes connected to the center taps have their cathodes connected to the cathode of a diode 235 whose anode is grounded. The diode having their cathodes connected to the center taps have their anodes connected to the anode of a diode 236 whose cathode is grounded. The common connection of the diode cathodes is also connected to the collector of an NPN transistor whose emitter is maintained approximately three volts negative. The common connection of the diode anodes is connected to the collector of a PNP transistor 239 whose emitter is maintained approximately three volts positive. The emitter of a second NPN transistor is connected to the base of NPN transistor 237 which is also coupled to its emitter by resistor 238. The base of PNP transistor 239 is similarly coupled to its emitter by the resistor 240 and to the collector of NPN transistor 241. The base of NPN transistor 241 is coupled to the negative three volt supply by resistor 242 and connected to the cathodes of two diodes 244 and 245. These diodes form an "or" gate. One input to the anode of 245 is the terminal 257 which is always driven sufficiently positive from a negative potential of three volts during the read phase of the memory cycle to cause all three transistors to become conducting. This action causes the collector of transistor 237 to draw current through diode 235 and the collector of transistor 239 to drawn current through diode 236. Additional current flows between the collectors by way of diodes 231 and 232, and by way of diodes 233 and 234. This condition results in a very low impedance path between the center taps of the two transformer primaries and ground. In effect, it clamps them to ground so that if a potential is established between either of the other core wire terminals and ground, current will flow through the core wire. If the transistors are not in a conducting state, the collectors of transistors 237 and 239 are free to rise to relatively high positive and negative voltages respectively with negligible current flow. The second input to the clamping circuit through diode 244 is from an "and" gate in which resistor 243 connected between the three volt source of positive potential and the anodes of diodes 246 and 247. The cathodes of these diodes are the inputs to the "and" gate. That of diode 246 is the terminal 255 which is connected to the system timer and goes from minus three volts to plus three volts during the write phase of the read write cycle. The other input through the cathode of diode 247 is connected to the output of the data register flip-flop element 258. When the flip-flop is in the zero condition, its output negative three volts or more. When it is in the one condition, its output is three or more volts positive. If the flip-flop is zero during the write phase, the transistors do not conduct so that the transformer primaries are not clamped and no current can flow through the core wire. When the flip-flop is one during write, both inputs to the "and" gate are positive causing conduction and clamping. It is to be noted that the values of voltage are given only by way of example and are not intended to be construed as limiting the use of the principles in any way.

Figures 20, 21:
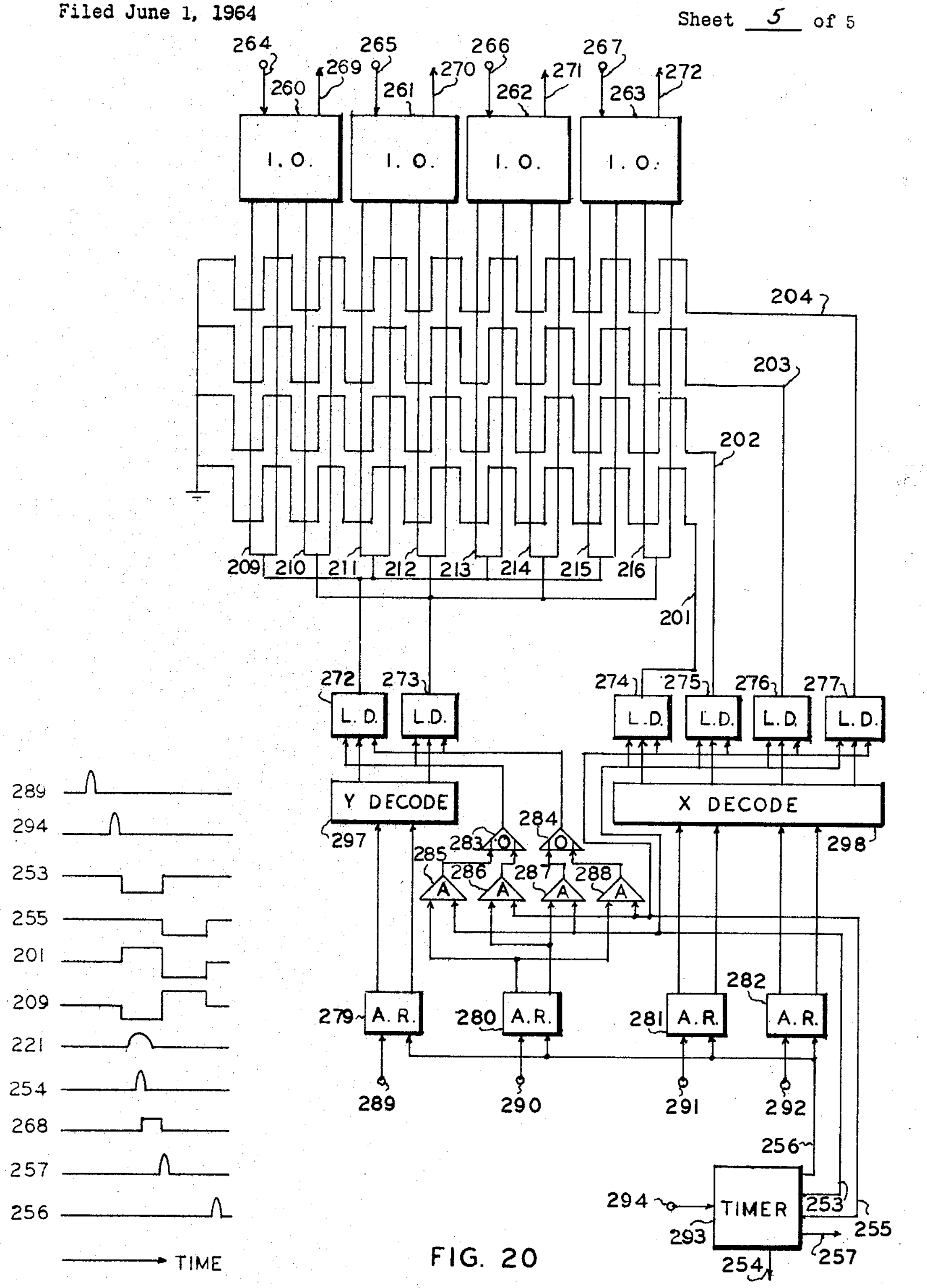
FIGURE 20 is a diagram of the memory system which operates with the array of FIGURE 16.
FIGURE 21 illustrates various signals generated with the circuit of FIGURE 20.

The operation of the system in accordance with the invention can be more clearly described by referring to the schematic diagram in FIGURE 20 and the diagram of various signals generated therein as shown in FIGURE 21. The numbers to the left of the diagram of FIGURE 21 correspond to the numbers designating the various lines in FIGURES 19 and 20. Referring to FIGURE 20, four input-output circuits like that shown in FIGURE 19 are shown at the top of the drawing as boxes 260, 261, 262, 263. The data input lines 264, 265, 266, and 267 correspond to line 264 in FIGURE 19. Output lines 269, 270, 271, and 272 correspond to line 268 in FIGURE 19. The control wires 201, 202, 203, and 204 are grounded at one end and energized by line drivers similar to those used in conventional memories and illustrated in FIGURE 14. The taps on the core wire loops 209, 210, 211, 212, 213, 214, 215, and 216 are connected in two groups and also energized by line drivers. One core wire loop serving each digit position forms one group and the remaining loops form the other. If more than two loops are used per digit position, there would be as many groups as loops per position. One of the line drivers connected to the control wires and one connected to the core loops are energized during a memory cycle. The line drivers to be activated are determined by the outputs of the X decoder 298 and Y decoder 297. These decoders are similar to those used in conventional core memories being diode matrices for converting the binary inputs from the address register to linear outputs. The X decoder 298 is controlled by the address register flip-flop elements 281 and 282. The Y decoder is controlled by flip-flop 279. One other address register flip-flop 280 controls a reversing circuit composed of "and" gates 285, 286, 287 and 288 and "or" gates 283 and 284. The input to the reversing circuit are the lines 253 and 255, which conduct the cycle phase pulses from the timer 293 to the line drivers. The timer 293 generates a series of pulses which control the memory operation during one read-write cycle. The timer is similar to other pulse sequence generators and is not shown in detail because these devices are constructed in many ways by those skilled in the art. Before the timer is activated by an initiate pulse applied to line 294 by the connected equipment, the address is received by the address register flip-flop elements of lines 289, 290, 291 and 292 also from the connected equipment. Referring to FIGURE 21, the uppermost curve shows the first signal to occur to be those required to set up the address register. Those digits which are one are represented by a pulse on the address input lines. Zeroes are represented by the absence of a pulse. The next signal is the timer initiate pulse. The first output of the timer is a negative rectangular pulse on line 255. These pulses are combined in the selected line drivers to generate pulse currents in the line. In the control lines, these currents are first positive then negative rectangular pulses. In the core line drivers, they may have the same polarity sequence as the control line currents 201 or they may have the sequence of polarity reversed as at 209. The sequence of polarity is controlled by the address flip-flop 280 and its connected reversing circuit to select either the front of the back half of the core line loops. Through the first line drive pulse the positive signal on line 253 is applied to the anode of diode 245 in FIGURE 19 which causes the transistor to conduct and clamps the transformer primary center taps to ground, thus causing the core wires selected for the operation to conduct read current. During the first line pulse cores at the intersections of the active control wire and the actively polarized core wires which are in the one polarity switch to zero generating an E.M.F. in the core wires and the transformer secondaries like that shown at 221. Those cores in the zero polarity cannot switch and do not produce an output. During this phase of operations, a strobe pulse is emitted by the timer on line 254 to open the "and" gate 248 in FIGURE 19 to pass a one signal, if it is generated, through the "or" gates 249 to set the data register flip-flop 258 to one and produce an output on line 268. If no information is to be received on the data lines from the connected equipment, the data register flip-flops retain the information retrieved through the write phase of the cycles. If new information is to be stored, a ready-to-write signal is received from the connected equipment on line 252 in FIGURE 19. This signal opens the "and" gate 251 so that a pulse on line 257 from the timer delivered at the end of the read pulse can be transmitted through the "or" gate 250 to reset the data register flip-flops. All of the reset terminals of the data register flip-flops are connected to the output of gate 250 so that only one each of gates 250 and 251 are required in a memory. After the flip-flops have been reset, new information is received on line 264. If a one is received, a pulse energizes 264 which passes through "or" gate 249 to set the flip-flop. If a zero is received, there is no pulse and the flip-flop remains reset. During the second phase, the line 255 is positive opening the "and" gate formed by diodes 246 and 247 to pass the signal from line 268 to the output of data flip-flop 258. If the flip-flop is in the one condition, the anode of diode 244 becomes positive to cause the transistors to conduct and clamp the transformer primary center taps to ground. If the flip-flop is zero, the anode of diode 244 is negative so that the transistors do not conduct and the transformer primary taps are free from clamping. In the former case during the second phase of the cycle, current flows in the core lines causing those cores selected by the active control wire to switch from zero to one polarity. In the latter case, no current can flow in the selected core wire so the core which had been switched to zero during the read phase remains in the zero polarity. After the store phase of the cycle is complete, an end of cycle pulse is generated by the timer 293 in FIGURE 20 on line 256 and delivered to the reset terminals of the address register flip-flops and to the "or" gate 250, FIGURE 19, to reset the data register flip-flops.

Cores having rectangular hysteresis loop characteristics may be used in this structure. It is only necessary that the cores be capable of being switched by regenerative flux switching.

It should be pointed out that double the number of control conductors may be used with half serving the front of the array and half the back. This system requires twice the number of X line drivers but eliminates the need for the reversing switch. This type of system is particularly suitable for arrays using printed circuit techniques like that indicated in FIGURE 6.

The magnetic memory described and its modifications in accordance with this invention employ a new principle of core switching that makes possible the use of cores having a closed magnetic path which encloses only one conductor. This type of core can be made by depositing magnetic material on the surface of a conducting wire. The wire can have such a small diameter that very high speed switching can be effected and large economies is power acquirements realized relative to memories using other types of cores. Output signal levels can be controlled over wide limits by suitable choice of core length and thickness. Compact construction can be achieved because of the small core size and low power components used. Finally, the cost of producing the cores and arranging them in a memory array is substantially below those operations in producing conventional memories.

I claim:

1. A random access magnetic core memory comprising an array of magnetic cores and their cooperating conductors and electronic circuits coupled to the array of said cores made of magnetic material in the form of hollow cylinders having characteristics which permit a magnetic field therein to be reversed in a section subject to two magnetomotive forces, neither of which acting separately can substantially disturb the field and one applied uniformly over the magnetic path can cause a field reversal in a section to propagate until the entire core is reversed, said cores positioned concentrically at intervals around sense and control conductors, said array having X selection conductors, each having plurality of pairs of parallel segments, segments of a pair positioned diametrically opposite one another, close to the outer surface of a core so that their axes are parallel to the axis of the core and equidistant therefrom, said array having Y selection conductors, each having a plurality of pairs of segments each positioned close to either side of a pair of segments of an X selection conductor their axes parallel to and in the plane common to the axes of the segments of the X selection conductor, said array arranged so that each X selection conductor has as many pairs of segments adjacent core on each sense and control conductor as there are Y selection conductors, as many pairs of segments in each Y selection conductor positioned about cores on each sense and control conductor as there are X selection conductors, means provided by said coupled electronic circuits for causing selected cores to switch including means for passing current through selected sense and control conductors to generate a uniform propagation magnetomotive force in the cores located on said conductor, means for passing current through one of the X selection conductors to generate magnetomotive force in parts of the cores between the sense and control conductors and the X selection conductors, segments having the same polarity of magnetomotive force as that produced in the sense and control conductors and half the intensity required to initiate field reversal in cores on energized sense and control conductors, means for passing current through one of the Y selection conductors to generate a magnetomotive force in the region of the cores nearest the segments having the polarity of the magnetomotive force produced by the current in the sense and control conductor, and half the intensity to initiate field reversal in a core on an energized sense and control conductor, means for detecting the voltage induced in sense and control conductor by flux reversal in a core subject to all three magnetomotive forces in the direction opposite its initial polarity.

2. A random access magnetic core memory comprised of an array of magnetic cores and their cooperating conductors and electronic circuits coupled to the array, cores of said array made of magnetic material in the form of hollow cylinders having characteristics permitting a magnetic field therein to be reversed in a section subject to two magnetomotive forces neither of which acting separately can substantially disturb the field and one applied uniformly over the magnetic path can cause the field reversal in a section to propagate until the field in the entire core is reversed, said cores positioned concentrically at intervals around sense and control conductors, said array having X selection conductors each having a plurality of pairs of parallel segments, segments of a pair positioned close to the ends of a diameter of a core so that their axes are parallel to and equidistant from that of the core, said array having Y selection conductors each having a plurality of pairs of segments located symmetrically close to either side of a pair of segments on an X selection conductor their axes parallel to and in the plane common to the axes of the segments of the X selection conductor, said array so arranged that each X selection conductor has as many pairs of segments adjacent cores on each sense and control conductor as there are Y selection conductors and as many pairs of segments in each Y selection conductor located about a core on each sense and control conductor as there are X selection conductors, means provided by said coupled electronic circuits for causing selected cores to switch including means for passing current through selected sense and control conductors to generate magnetomotive forces in the cores located in said conductor of an intensity sufficient to complete propagation of established field sections in the cores in the prescribed polarity and limited to an intensity less than that required to substantially disturb uniform fields in the cores, means for passing current through one of the X selection conductors to generate a magnetomotive force in the parts of the cores nearest the segments having the direction and intensity required to reverse the field in cores on energized sense and control conductors, means for passing current through all of the Y selection conductors except one having the direction and magnitude to generate a magnetomotive force of opposing polarity and the intensity to cancel that produced by currents in the energized X selection conductors in the parts of the cores nearest the segments, means for detecting voltage induced in the sense and control conductors by field reversal in cores on the energized sense and control conductors which are not cancelled by the magnetomotive force generated by currents in the Y selection conductors.

3. A random access core memory comprised of an array of magnetic cores and conductors which includes Y select conductors and conductors which combine the functions of X select, write control and sense conductors and cooperating electronic circuits which include means for selecting and energizing specified Y select conductors and X select conductors, means for controlling current in the selected X conductors during writing, and means for sensing voltage induced in the X conductors by flux reversal in selected cores during read, said X conductors arranged in pairs one end of each conductor of a pair coupled to a source of X selection signals and a pair forming arms of substantially equal small signal impedance of a bridge, said write control circuit including two other electrical paths of substantially equal impedance forming the other two arms of the bridge and having a common connection to the means for controlling current, said means for sensing voltage being differentially coupled to two points of connection common to one X conductor of a pair and one path of the write control circuit, said X conductors and Y conductors so disposed in relation to one another and so energized that one and only one core of all the cores served by one pair of X conductors can be switched during one operating cycle.

4. A random access magnetic core memory comprised of an array of magnetic cores and conductors which includes Y select conductors and conductors which combine the functions of X selection write control and sense conductors and cooperating electronic circuits which include means for selecting and energizing specified X and Y conductors with read and write signals, means for controlling the current in the selected X conductors during write, means for detecting voltage induced in the selected X conductors by flux reversal in cores during read and at least one multiple primary coupling transformer, said X conductors arranged in pairs with one end of each conductor coupled together and to an X selection circuit and the other ends coupled to the terminals of a center tapped primary of a transformer, said center tap coupled to a write current control circuit, said transformer having other centers tapped primaries serving other pairs of X conductors in the same way and a secondary coupled to said sensing circuit, said Y conductor coupled to the Y selection circuits, said X and Y conductors having common coupling to cores so that concurrent signals must be present in the conductors serving one core to cause it to switch and so arranged and energized that only one core coupled to the X conductors coupled to one transformer can be switched during one operation.

5. A random access magnetic core memory comprised of an array of magnetic cores and conductors and cooperating electronic circuits, cores of said array having a hollow cylindrical form normally magnetized in a circumferential path and characteristics which permit a magnetic field therein to be reversed in a section of the path subject to two magnetomotive forces which acting alone have less intensity than that required to substantially disturb the field and one of which applied uniformly over the magnetic path can cause a field reversal in a section of the path to propagate until the entire core is reversed, said array including cylindrical X select conductors around which the cores are positioned coaxially at intervals and Y select conductors which are formed in pairs of segments which have substantially the same length as the cores and are positioned with each segment of a pair close to the ends of a diameter of a core equidistant from its center with their ends in line with the ends of the core, their axes parallel to that of the core and connected so that current passed through the Y conductor flows in the same direction in each of a pair of segments and generates magnetomotive forces in the parts of the core nearest the segments having the same direction along the circumferential magnetic path, said electronic circuits including means for selecting and energizing prescribed conductors and Y conductors with sequential bipolar signals, means for controlling the current in the selected X conductors during write operation and means for sensing voltage generated in X conductors by the flux reversal in cores during read operations in one or more transformers with multiple primary windings, said X conductors arranged in pairs with one end of each conductor coupled together and to a source of X selection signals and the other ends connected to the terminals of one of a plurality of centertapped primaries of a transformer, the center taps of which are coupled to said write current control circuit said transformer having a secondary coupled to said voltage sensing circuit, said X and Y conductors arranged and so energized that only one core on all of the X conductors coupled to the primaries of one transformer can be switched during one operation.

6. An element in a magnetic core memory array comprised of a core formed by a film of ferromagnetic material deposited on a cylindrical conducting substrate and a second conductor coupled to said core, said second conductor having two segments whose axes are parallel to that of the core, positioned symmetrically close to opposite sides of the core, extending along the length of the core and insulated therefrom, said second conductor so shaped that current flowing therethrough passes in the same direction in each segment, said conducting substrate threading other cores in a row in the memory array and coupled to a source of read-write current and a sensing circuit, said second conductor having other segments coupled to other cores in a column of the array, each of which is on a different substrate, said second conductor coupled to a source of read-write current, said currents, when coincident in time in both conductors being in directions that produce additive magnetomotive forces in the parts of the core nearest the second conductor segments.

7. An element in a magnetic core memory array comprised of a core formed by a film of ferromagnetic material deposited on a cylindrical conducting substrate, a second conductor and a third conductor each coupled to said core, said second conductor having two segments whose axes are parallel to and lie in a plane common to that of the core positioned symmetrically close to opposite sides of the core, extending along the length of the core and insulated therefrom, said second conductor so shaped that current flowing therethrough passes in the same direction in each segment, said third conductor having two segments whose axes lie in the plane defined by the axes of the other conductors and parallel thereto, extending along the length of the core, insulated from both the core and the second conductor, and positioned close to the core, said third conductor so shaped that current flowing therethrough passes in the same direction in each segment, said conducting substrate threading other cores in a row in the memory array and coupled to a source of read-write current and a sensing circuit, said second conductor having other segments coupled to other cores in a column of the array each of which is on a different substrate, said second conductor coupled to a source of read-write current, said currents in said substrate and said second conductors, when coincident in time, being in directions that produce additive magnetomotive forces in the core where it passes through the plane of the conductors' axes, said third conductor having other segments coupled to other cores in the array and coupled to a source of write inhibit currents said inhibit currents flowing through the segments of said third conductor in a direction to generate magnetomotive forces which oppose those generated in the core by the write currents conducted by the second conductor.

8. An element of a magnetic core memory array comprised of a hollow core, a first conductor which passes through said core and a second conductor external to said core having at least one segment positioned close to a surface of said core and substantially perpendicular to the flux path of the core where it is nearest said segment of said second conductor, said second conductor so shaped that current passing therethrough generates a magnetomotive force around each segment positioned close to the surface of said core which, in the region of said core close to each segment, is in the direction along the flux path which would aid in establishing a magnetic field of one polarity.

References Cited

UNITED STATES PATENTS

| | | | |
|---|---|---|---|
| 3,215,992 | 11/1965 | Schallerer | 340—174 |
| 3,126,532 | 3/1964 | Woods | 340—174 |
| 3,214,741 | 10/1965 | Tillman | 340—174 |
| 3,305,726 | 2/1967 | Goodman et al. | 307—88 |

TERRELL W. FEARS, *Primary Examiner.*

P. SPERBER, *Assistant Examiner.*